United States Patent
Claringburn et al.

(10) Patent No.: US 7,860,396 B2
(45) Date of Patent: Dec. 28, 2010

(54) NOISE REDUCTION IN OPTICAL COMMUNICATIONS NETWORKS

(75) Inventors: Harry Richard Claringburn, Westdale Lane (GB); Michael Sharratt, Bramcote (GB)

(73) Assignee: Ericsson AB, Stockholm (SE)

( * ) Notice: Subject to any disclaimer, the term of this patent is extended or adjusted under 35 U.S.C. 154(b) by 641 days.

(21) Appl. No.: 10/500,905

(22) PCT Filed: Dec. 17, 2002

(86) PCT No.: PCT/GB02/05721
§ 371 (c)(1), (2), (4) Date: Jan. 31, 2005

(87) PCT Pub. No.: WO03/056738
PCT Pub. Date: Jul. 10, 2003

(65) Prior Publication Data
US 2005/0117907 A1   Jun. 2, 2005

(30) Foreign Application Priority Data
Jan. 4, 2002 (GB) .................. 0200177.4

(51) Int. Cl.
*H04J 14/02* (2006.01)
(52) U.S. Cl. .............. 398/83; 398/82; 398/97; 359/337.1
(58) Field of Classification Search .............. 398/48, 398/58, 59, 82, 83, 174, 175; 359/337.11; 385/16
See application file for complete search history.

(56) References Cited

U.S. PATENT DOCUMENTS

| | | | |
|---|---|---|---|
| 5,436,921 A * | 7/1995 | Corio | 372/26 |
| 5,504,827 A | 4/1996 | Schimpe | |
| 5,917,625 A | 6/1999 | Ogusu et al. | |
| 6,285,479 B1 | 9/2001 | Okazaki | |
| 6,288,810 B1 | 9/2001 | Grasso et al. | |
| 6,323,994 B1 | 11/2001 | Li | |
| 6,400,498 B1 * | 6/2002 | Shimomura et al. | 359/341.1 |
| 6,504,963 B1 * | 1/2003 | Fang et al. | 385/16 |
| 6,538,782 B1 * | 3/2003 | Otsuka et al. | 398/82 |
| 6,633,430 B1 * | 10/2003 | Monnard et al. | 359/337.11 |
| 7,106,969 B1 * | 9/2006 | Lichtman et al. | 398/59 |
| 2001/0040710 A1 * | 11/2001 | Sharratt et al. | 359/119 |
| 2002/0105695 A1 * | 8/2002 | DeGrange et al. | 359/127 |
| 2003/0002104 A1 * | 1/2003 | Caroli et al. | 359/127 |

FOREIGN PATENT DOCUMENTS

DE  43 26 522 A1  2/1995

(Continued)

*Primary Examiner*—Li Liu
(74) *Attorney, Agent, or Firm*—Kirschstein, et al.

(57) ABSTRACT

The add path of a dense wavelength division multiplexing (DWDM) add/drop node comprises an n:1 coupler for combining n signal sources. The combined signal is amplified and then demultiplexed. Each output of the demultiplexer is passed through a variable optical attenuator (VOA) and the VOA outputs multiplexed to form the add signal. Channels carrying no add signal and not used to control the added signals are attenuated to zero to remove a broadband noise contribution from those channels. The signal sources are run at maximum power and the signals of those channels are attenuated by the respective VOAs to control their amplitude and optimize the optical signal to noise ratio of the add signal.

6 Claims, 3 Drawing Sheets

FOREIGN PATENT DOCUMENTS

| | | |
|---|---|---|
| EP | 0 242 802 A2 | 10/1989 |
| EP | 0 766 357 A1 | 4/1997 |
| EP | 0 766 358 A1 | 4/1997 |
| EP | 0 959 577 A2 | 11/1999 |
| EP | 0 967 752 A2 | 12/1999 |
| EP | 1 006 688 A2 | 6/2000 |
| EP | 1 065 821 A2 | 1/2001 |
| EP | 1 089 479 A2 | 4/2001 |
| EP | 0 098 465 A1 | 5/2001 |
| EP | 1 120 925 A1 | 8/2001 |
| EP | 1 156 607 A2 | 11/2001 |
| EP | 1156607 * | 11/2001 |
| GB | 2 362 525 A | 11/2001 |
| WO | WO 01/61903 A1 | 8/2001 |

* cited by examiner

NOISE REDUCTION IN OPTICAL COMMUNICATIONS NETWORKS

BACKGROUND OF THE INVENTION

This invention relates to the reduction of noise in optical communications networks, and in particular, to the reduction of noise in an add path where signals are placed onto the network at a network node.

Add/Drop multiplexers are widely used in optical communications networks to provide wavelength non-specific add/drop ports. This allows random transponder provisioning and tuneability. FIG. 1 shows an example of how add/drop multiplexers are used. The optical network is a dual fibre DWDM optical network with one fibre 10 carrying traffic in an East/West direction and the other fibre 12 in a West/East direction. The terms East and West are conveniently used to describe the direction in which network traffic travels and does not correspond to geographical East or West. The traffic is a multiplex, typically, of 32 wavelength channels. At network nodes, traffic is taken off the network and split into the component channels using an optical demultiplexer or a splitter and band pass filter and added into the network using an optical multiplexer and an add coupler.

The network nodes can add or drop traffic to either of the network fibres. It is desirable to route traffic the shortest distance around the network which will depend on the location of the destination node. It is also desirable to have a fall back path should one of the E/W or W/E paths fail.

Thus, in FIG. 1, each of the E/W and W/E network fibres comprise an amplification stage 14. This is a EDFA amplifier although this may be omitted in shorter networks. The applied signal is split in a 2:1 coupler 16 to provide two signal output paths. A through path 18 carries traffic that remains on the network and a drop path 20 drops the signal multiplex from the network for processing at the network node.

Each of the two dropped paths are input to an optical demultiplexer 22 which splits the signal into its constituent wavelength components. The receive transponder includes a switch 24 to select the signal output from one of the two demultiplexers. In practice in a 32 channel node, this switch will receive 32 channels from each of the demultiplexers.

Signals remaining on the through path pass through a channel control unit 26 and then to an add coupler 28 in which signals from the transmit side of the node transponder are added onto the network. The output of the add coupler is finally amplified again at 30 if required.

The add side of the transponder comprises an amplifier 32 and an n:1 add coupler 34, where n is the number of wavelengths in the multiplex carried by the network. The add coupler is required to add the individual wavelength signals that are to be placed onto the network. Use of add couplers has the disadvantage of incurring losses and causing the add power level to require amplification. Thus, the add signal is amplified. This in turn causes broadband noise which passes into the system degrading the OSNR (optical signal to noise ratio) of the added signals as well as those signals passing through the photonic add/drop node. It is known to add tuneable filters 36 following the add amplifier to remove the noise added to the through channels.

In the figure, the add coupler is shown as a multiplexer 34. Separate multiplexers may be used on the east and west paths.

The noise that is generated is dependant on the gain of the amplifier in the add path. This gain is determined by the maximum possible losses in the add path. When a signal is added, the source powers are adjusted on a per channel basis to achieve the required power at the point of addition. The signal to noise ratio is therefore worst when the loss of the add path is less than the maximum loss possible. The OSNR is optimised when the path loss is a maximum as the noise from the EDFA amplifier experiences the maximum loss.

This situation is undesirable and the present invention seeks to overcome by improving or optimising the add channel OSNR.

BRIEF SUMMARY OF THE INVENTION

In its broadest form the invention overcomes the problem by filtering out the EDFA noise on signal paths which have no add content and controlling the signal amplitude of the added signals after amplification.

More specifically, there is provided an optical network node for an n channel DWDM optical network, the node comprising an add path for adding an n-channel wavelength multiplex onto the network, in which some of the n channels carry signals to be added onto the network, wherein the add path comprises an n-channel signal combiner for combining the n signal channels, an optical amplifier for amplifying the ouput of the signal combiner, a multichannel wavelength selective filter with variable per channel loss for blocking channels not carrying signals to be added to the network or controlling the amplitude of the added signals, and an add coupler for coupling the add path to the network.

The invention also provides a method of adding an n-channel DWDM signal to an n-channel DWDM network comprising the steps of combining signals from a plurality of signal sources to provide an n-channel add signal output, amplifying the combined output, using a multichannel wavelength selective filter with variable per channel attenuation to selectively block wavelength channels of the combined signal not carrying signals to be added onto the network or to control the amplitude of the added signal, and coupling the n-channel add signal onto the optical network.

In an embodiment of the invention, the wavelength selective filter attenuates channels carrying signals to be added to the network to control their amplitude.

Preferably, the selective band pass filter comprises an n-channel demultiplexer having n outputs, an n channel multiplexer having n inputs and a variable optical attenuator arranged between each of the demultiplexer outputs and multiplexer inputs, wherein the variable attenuator on any given channel is set to block the signal on that channel if no signal on that channel is to be added onto the network.

By demultiplexing the channels of the amplified output of the add signal combiner, a variable optical attenuator can be used on each channel selectively to filter out the contribution of that channel to the broadband noise if that channel does not carry an add signal. This has the advantage that the broadband noise in the add path can be reduced.

Preferably, the add signal sources are run at full power and the respective VOAs are used to control the power of the signals in these channels.

This has the further advantage of further improving the OSNR of the add path signal.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENTS

Figure 2:
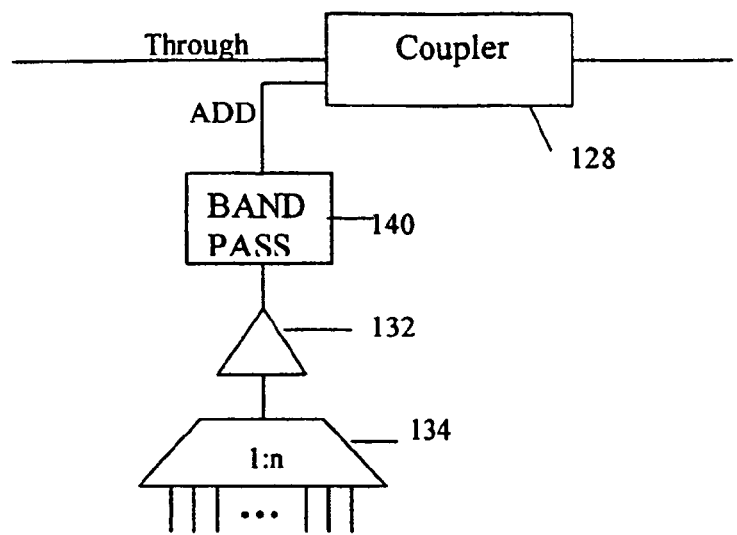
FIG. 2 is a view of a portion of the node of FIG. 1 modified to embody the invention.

The add path shown in FIG. 2 comprises a 32:1 combiner 134 which combines the 32 signal channels to produce a single output signal which is amplified by amplifier 132 and then passed to a WDM multiplexer/demultiplexer device 140. This device is illustrated in more detail in FIG. 3. The output of the device 140 forms the add input to add coupler 128 on one of the E/W and W/E paths of the network.

Figure 3:
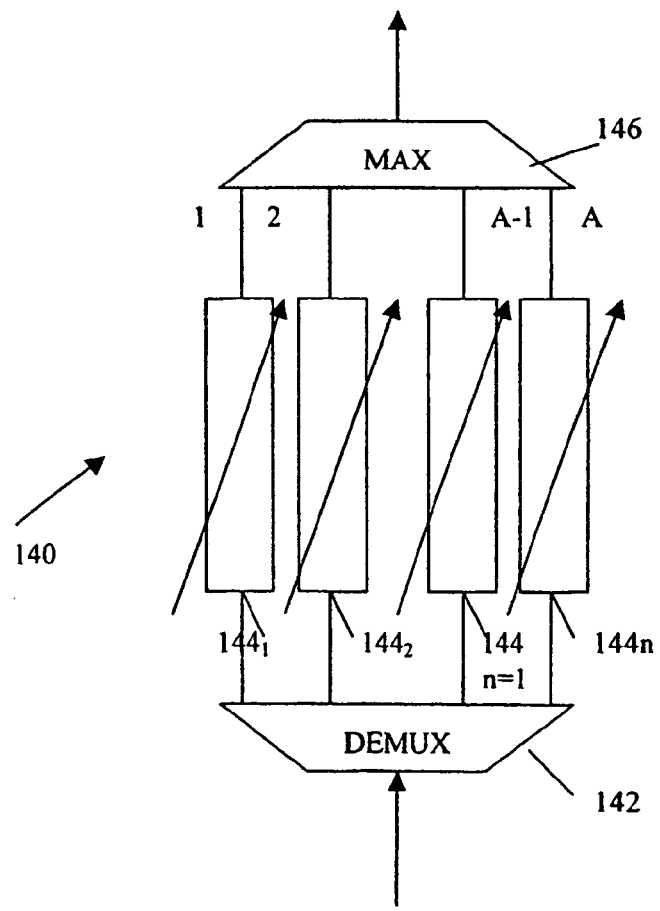
FIG. 3 is a more detailed view of the multiplexer/demultiplexer arrangement of FIG. 2.

FIG. 3 shows the mux/demux device 140 in more detail. The device comprises an optical demultiplexer 142 which receives the multiple wavelength input signal and splits it into n single wavelength outputs. In this example, n=32 and is the number of channels supported by the network. Each of the 1 to n outputs of the demultiplexer 142 is passed through an individual variable optical attenuator (VOA) 144(1) ... 144(n). The outputs of the 32 variable optical attenuators form the 1 to 32 inputs to an optical multiplexer 146 which remultiplexes the 32 signal paths to output a DWDM multiplex to be added back onto the network by one of the add couplers 28.

Thus, the device 140 is a 2 port device which provides filtering around the channels but which also can adjust the through loss on a channel to channel basis.

Variable optical attenuators (VOAs) are well known and commonly used in optical networks. They can be used to match optical power levels and equalise the power between different DWDM channels, as well as for other applications. VOAs are used to equalise power levels in the output of multiplexers. In the embodiment of FIG. 3, the multiplexer demultiplier and VOA array is used to block noise on channels that are not being added or used to control the added channels. The optical sources being added are run at maximum power and their output amplitude controlled by the respective VOA 144 assigned to that channel. The worst case occurs when the add path losses are at a maximum which equates to the best OSNR achieved before use of the VOAs. As the add path losses fall, the device 140 introduces more attenuation to control the signal amplitude reaching the output. Thus the signal amplitude remains the same but the EDPA noise experiences greater attenuation improves the OSNR of the added signal.

Figure 1:
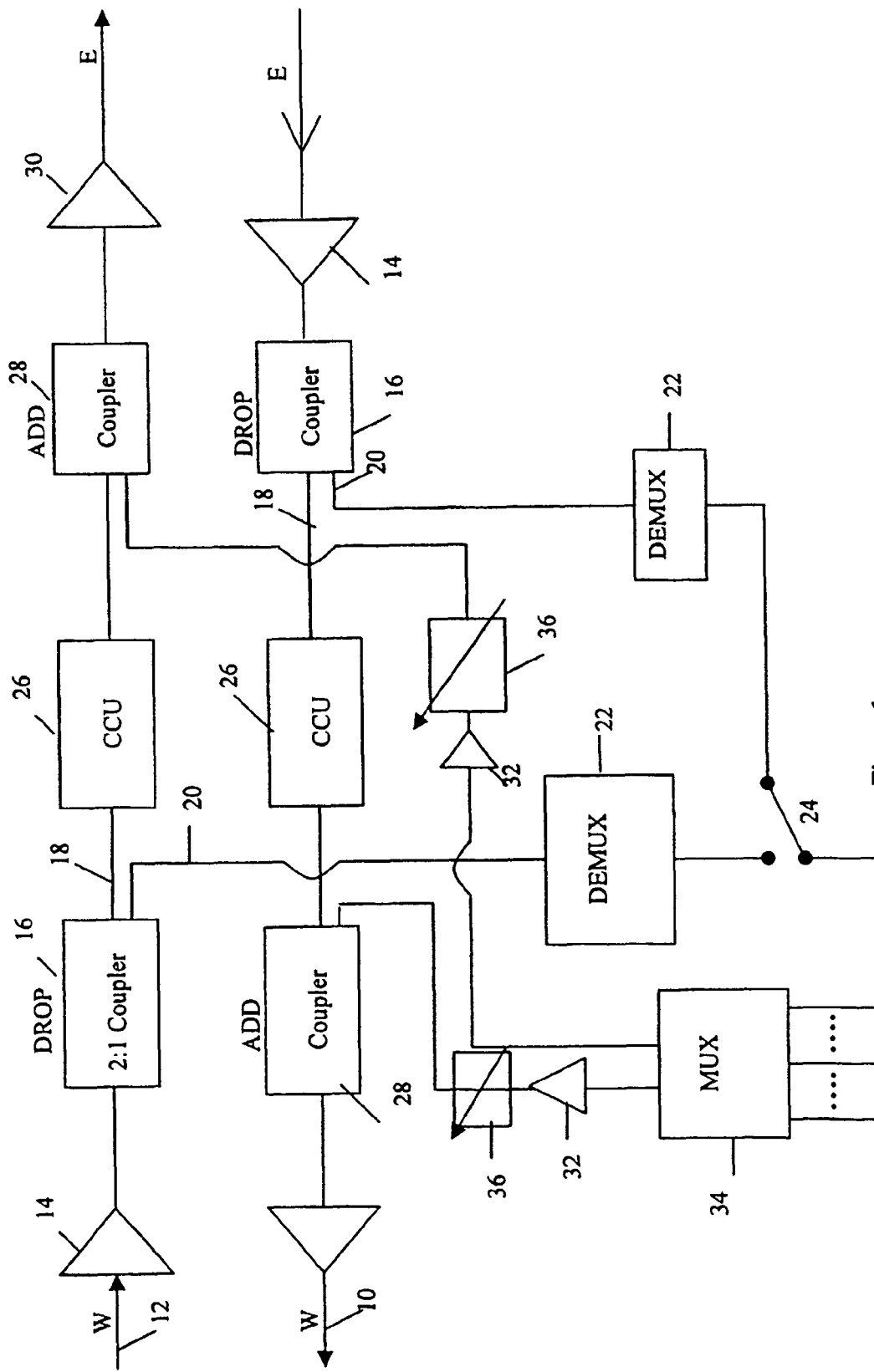
FIG. 1 is a schematic diagram of a known add/drop node on an optical network described previously.
Figure 4:
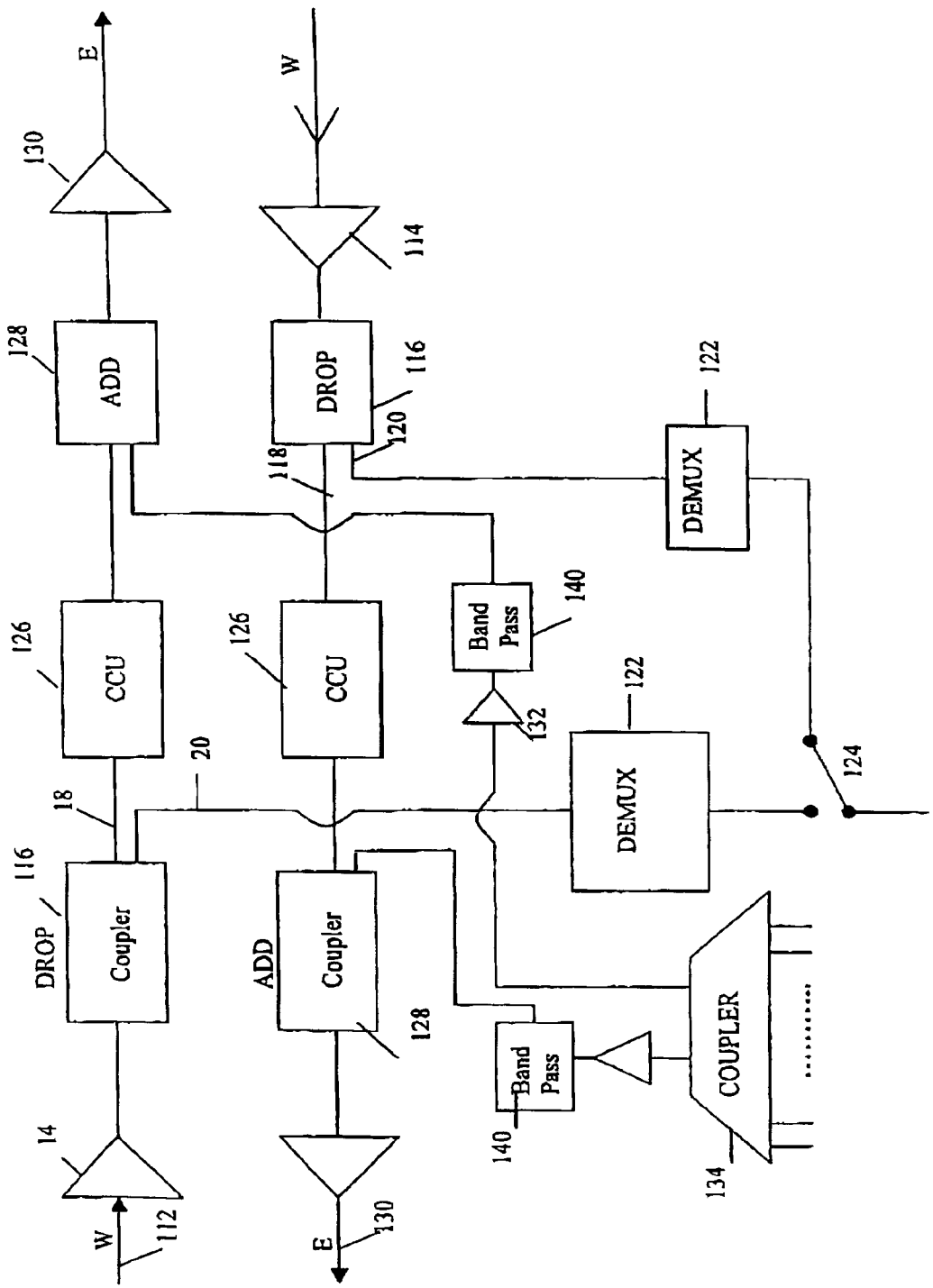
FIG. 4 is a view, similar to FIG. 1 of an add/drop node embodying the invention.

FIG. 4 shows how the device of FIGS. 2 and 3 can be incorporated into the add drop node of FIG. 1. It will appreciated that a mux/demux device 140 is inserted into the add path of each of the add paths to the E/W and W/E fibre paths. In FIG. 4, the references of FIG. 1 are incremented by 100 and the components are otherwise unchanged.

Various modifications to the embodiment described are possible and will occur to is those skilled in the art. The invention is not confined to any particular optical network type and may be used on ring or line networks with or without network amplification. Various devices are suitable for use as the optical multiplexer and demultiplexer and variable optical attenuators. The invention is limited only by the scope of the following claims.

The invention claimed is:

1. An optical network node for an n-channel dense wavelength division multiplexing (DWDM) optical network, the node comprising: an add path for adding an n-channel wavelength multiplex onto the network, some of the n-channels carrying signals to be added onto the network, the add path including an n-channel signal combiner for combining the n signal channels, an optical amplifier for amplifying an output of the signal combiner, a multichannel wavelength selective filter with variable-per-channel attenuation for blocking channels not carrying signals to be added to the network and controlling an amplitude of the added signals, and for filtering around the channels, and an add coupler for coupling the add path to the network, and the node further comprising means for running sources for generating the n-channel signals at maximum power.

2. The optical network node according to claim 1, wherein the multichannel wavelength selective filter includes an n-channel demultiplexer having n outputs, an n-channel multiplexer having n inputs, and a variable optical attenuator arranged between each of the demultiplexer outputs and multiplexer inputs, wherein the variable attenuator on any given channel is set to block the signal on that channel if no signal on that channel is to be added onto the network, or used to control the amplitude of the added signals.

3. A dense wavelength division multiplexing (DWDM) optical communications network having a plurality of nodes, each node comprising: an add path for adding an n-channel wavelength multiplex onto the network, some of the n-channels carrying signals to be added onto the network, the add path including an n-channel signal combiner for combining the n signal channels, an optical amplifier for amplifying an output of the signal combiner, a multichannel wavelength selective filter with variable-per-channel attenuation for blocking channels not carrying signals to be added to the network and controlling an amplitude of the added signals, and for filtering around the channels, and an add coupler for coupling the add path to the network, and the node further comprising means for running sources for generating the n-channel signals at maximum power.

4. A method of adding an n-channel dense wavelength division multiplexing (DWDM) signal to an n-channel DWDM optical network, comprising the steps of: combining signals from a plurality of signal sources to provide an n-channel add signal combined output signal; amplifying the combined output signal; using a multichannel wavelength selective filter with variable-per-channel attenuation to selectively block channels of the combined output signal not carrying signals to be added onto the network and to control an amplitude of the added signals, and filtering around the channels; coupling the n-channel add signal onto the optical network; and running the signal sources at full power to optimize an optical signal-to-noise ratio of the signals added to the network.

5. The method according to claim 4, comprising demultiplexing the n-channel add signal using an n-channel demultiplexer, passing each output channel of the demultiplexer through a variable optical attenuator (VOA), and multiplexing VOA outputs to form the network add signal.

6. The method according to claim 5, wherein the non-signal carrying channels are blocked by attenuating to zero the outputs from the demultiplexer corresponding to those channels.

* * * * *

UNITED STATES PATENT AND TRADEMARK OFFICE
CERTIFICATE OF CORRECTION

PATENT NO. : 7,860,396 B2  
APPLICATION NO. : 10/500905  
DATED : December 28, 2010  
INVENTOR(S) : Claringburn et al.

Page 1 of 1

It is certified that error appears in the above-identified patent and that said Letters Patent is hereby corrected as shown below:

On Title Page 2, in Item (56), under "Foreign Patent Documents", in Column 2, Line 2, delete "0 098 465 A1" and insert -- 1 098 465 A1 --, therefor.

In Column 2, Line 22, delete "ouput" and insert -- output --, therefor.

In Column 3, Lines 26-27, delete "remultiplexes" and insert -- demultiplexes --, therefor.

In Column 3, Line 48, delete "EDPA" and insert -- EDFA --, therefor.

In Column 3, Line 57, delete "to is" and insert -- to --, therefor.

Signed and Sealed this  
Twenty-fourth Day of May, 2011

David J. Kappos  
*Director of the United States Patent and Trademark Office*